(12) United States Patent
Hashikawa et al.

(10) Patent No.: US 11,880,160 B2
(45) Date of Patent: Jan. 23, 2024

(54) FILTER HOLDING DEVICE, DEVELOPING DEVICE, PROCESS CARTRIDGE, IMAGE FORMING APPARATUS, AND FILTER

(71) Applicants: Hotaru Hashikawa, Kanagawa (JP); Tatsuya Kubo, Kanagawa (JP); Kazuki Yogosawa, Tokyo (JP); Yuta Yabuta, Kanagawa (JP); Takuya Suganuma, Kanagawa (JP)

(72) Inventors: Hotaru Hashikawa, Kanagawa (JP); Tatsuya Kubo, Kanagawa (JP); Kazuki Yogosawa, Tokyo (JP); Yuta Yabuta, Kanagawa (JP); Takuya Suganuma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 225 days.

(21) Appl. No.: 17/494,834

(22) Filed: Oct. 6, 2021

(65) Prior Publication Data

US 2022/0107605 A1    Apr. 7, 2022

(30) Foreign Application Priority Data

Oct. 7, 2020   (JP) ................................. 2020-169657

(51) Int. Cl.
| | | |
|---|---|---|
| *G03G 15/08* | (2006.01) | |
| *G03G 21/00* | (2006.01) | |
| *B01D 46/00* | (2022.01) | |
| *G03G 21/20* | (2006.01) | |
| *B01D 46/64* | (2022.01) | |
| *B01D 46/56* | (2022.01) | |

(52) U.S. Cl.
CPC ....... *G03G 21/206* (2013.01); *B01D 46/0005* (2013.01); *B01D 46/56* (2022.01);
(Continued)

(58) Field of Classification Search
CPC ......... G03G 21/206; G03G 2221/1645; G03G 15/0898; B41J 29/377; B01D 46/0005;
(Continued)

(56) References Cited

U.S. PATENT DOCUMENTS 4,377,334 A * 3/1983 Nishikawa ......... G03G 15/0942
399/279
5,887,227 A * 3/1999 Kawai ................ G03G 15/0126
399/119
(Continued)

FOREIGN PATENT DOCUMENTS

JP       9-311553        12/1997
JP       2005-346035     12/2005
(Continued)

*Primary Examiner* — Robert B Beatty
(74) *Attorney, Agent, or Firm* — XSENSUS LLP (57) ABSTRACT

A filter holding device includes an opening portion and a filter. The opening portion communicates an inside of the filter holding device with an outside of the filter holding device. The filter includes a first side and a second side. The first side faces the inside of the filter holding device. The second side faces the outside of the filter holding device. The filter has a lower weight density per unit volume at the first side than at the second side. At least a side face of the first side of the filter is covered with an air-impermeable member. The side face is a lateral face of the filter at the first side.

17 Claims, 5 Drawing Sheets

(52) U.S. Cl.
CPC ......... *B01D 46/64* (2022.01); *G03G 15/0898* (2013.01); *B01D 2275/10* (2013.01); *B01D 2275/205* (2013.01); *B01D 2275/307* (2013.01); *B01D 2279/45* (2013.01); *G03G 2221/1645* (2013.01)

(58) Field of Classification Search
CPC .. B01D 46/56; B01D 46/64; B01D 2275/307; B01D 2275/10; B01D 2279/45
USPC .............................................. 399/93; 95/287
See application file for complete search history.

(56) References Cited

U.S. PATENT DOCUMENTS

| | | |
|---|---|---|
| 2014/0270838 A1 | 9/2014 | Yoshizawa et al. |
| 2017/0336734 A1* | 11/2017 | Nagashima ............ G03G 15/09 |
| 2018/0120737 A1 | 5/2018 | Okamoto et al. |
| 2018/0147517 A1* | 5/2018 | Kurita .................... B01D 46/10 |
| 2018/0253030 A1* | 9/2018 | Sako ................... G03G 15/0872 |
| 2018/0348698 A1 | 12/2018 | Tamaki et al. |
| 2020/0301313 A1 | 9/2020 | Suganuma et al. |
| 2022/0121138 A1* | 4/2022 | Yamada ............. G03G 15/0898 |
| 2022/0395771 A1* | 12/2022 | Hoshi ................ B01D 46/0005 |
| 2023/0168608 A1* | 6/2023 | Chiba ................ G03G 15/0881 399/258 |

FOREIGN PATENT DOCUMENTS

| | | | |
|---|---|---|---|
| JP | 2005346035 A | * | 12/2005 |
| JP | 2011026723 A | * | 2/2011 |
| JP | 2014-178347 | | 9/2014 |
| JP | 2014178562 A | * | 9/2014 |
| JP | 2018-072619 | | 5/2018 |
| JP | 2018197835 A | * | 12/2018 |
| WO | WO-2022074490 A1 | * | 4/2022 |

* cited by examiner

FILTER HOLDING DEVICE, DEVELOPING DEVICE, PROCESS CARTRIDGE, IMAGE FORMING APPARATUS, AND FILTER

CROSS-REFERENCE TO RELATED APPLICATION

This patent application is based on and claims priority pursuant to 35 U.S.C. § 119(a) to Japanese Patent Application No. 2020-169657, filed on Oct. 7, 2020, in the Japan Patent Office, the entire disclosure of which is incorporated by reference herein.

BACKGROUND

Technical Field

Embodiments of the present disclosure relate to a filter holding device in which a filter is disposed in an opening portion, a developing device containing a toner, a process cartridge, an image forming apparatus including at least one of the filter holding device, the developing device, the process cartridge, and the filter.

Related Art

There is known a technology of disposing a filter in an opening portion formed in an upper part of a developing case in a developing device installed in an image forming apparatus such as a copying machine or a printer, for the purpose of preventing toner scattering due to an increase of an internal pressure in the developing device.

SUMMARY

In an aspect of the present disclosure, there is provided a filter holding device that includes an opening portion and a filter. The opening portion communicates an inside of the filter holding device with an outside of the filter holding device. The filter includes a first side and a second side. The first side faces the inside of the filter holding device. The second side faces the outside of the filter holding device. The filter has a lower weight density per unit volume at the first side than at the second side. At least a side face of the first side of the filter is covered with an air-impermeable member. The side face is a lateral face of the filter at the first side.

In another aspect of the present disclosure, there is provided a developing device that includes the filter holding device.

In still another aspect of the present disclosure, there is provided a process cartridge that includes the developing device.

In still yet another aspect of the present disclosure, there is provided an image forming apparatus that includes the process cartridge.

In still yet further another aspect of the present disclosure, there is provided a filter that includes a high-density portion and a low-density portion. The low-density portion has a lower weight density per unit volume than the high-density portion. A side face of the low-density portion is covered with an air-impermeable member as an air-impermeable face.

BRIEF DESCRIPTION OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 1:
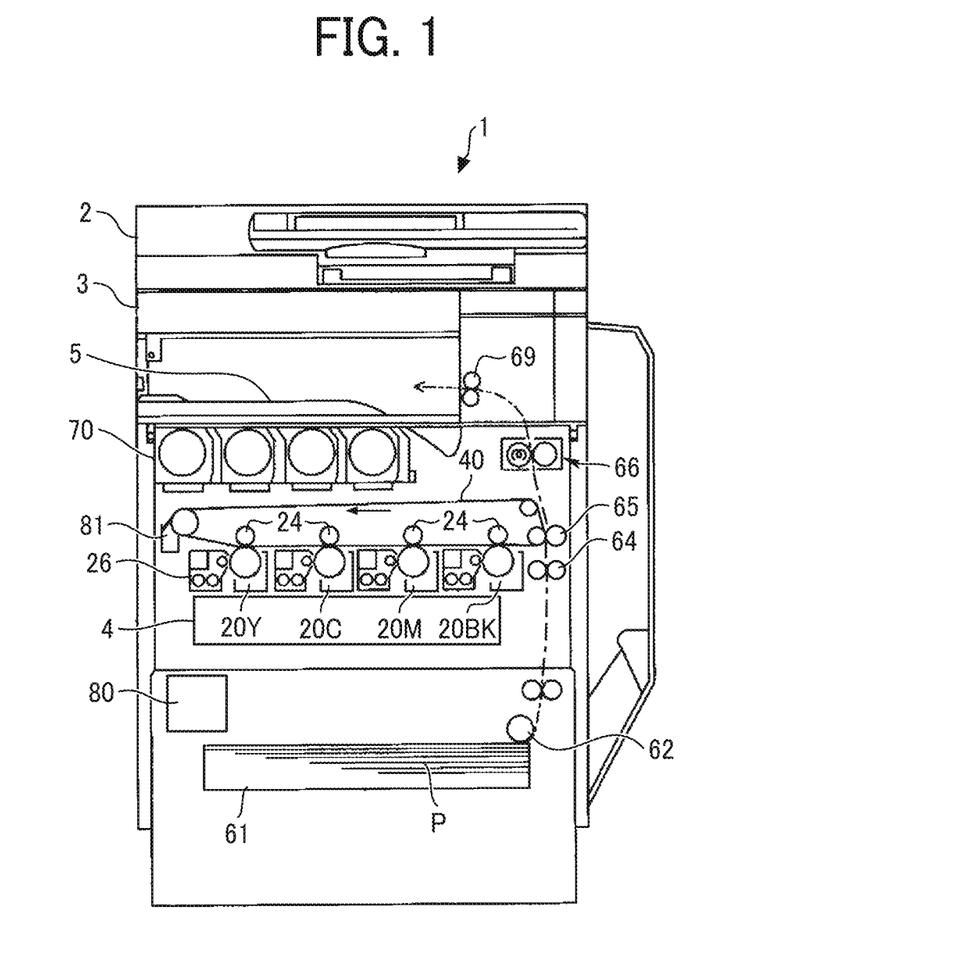
FIG. 1 is a schematic view of an image forming apparatus according to an embodiment of the present disclosure.

Referring now to FIG. 1, a description is given of an overall configuration and operation of an image forming apparatus 1 according to an embodiment of the present disclosure. The image forming apparatus 1 according to the present embodiment is a tandem multicolor image forming apparatus in which process cartridges 20Y, 20M, 20C, and 20BK are arranged in parallel to each other, facing an intermediate transfer belt 40. A developing device 26 as a filter holding device, which is a device with a filter, is disposed to face a photoconductor drum 21 in each of the process cartridges 20Y, 20M, 20C, and 20BK as illustrated in FIG. 2.

In FIG. 1, the image forming apparatus 1, which is main body of a color copier in the present embodiment, includes a document conveyor 2, a scanner 3 as a document reading device, and a writing device 4 as an exposure device. The document conveyor 2 conveys a document to the scanner 3. The scanner 3 reads image data of the document. The writing device 4 emits a laser beam based on input image data. Yellow, magenta, cyan and black toner images are formed on the surfaces of the photoconductor drums 21 of the process cartridges 20Y, 20M, 20C, and 20BK, respectively. The yellow, magenta, cyan and black toner images on the photoconductor drums 21 are transferred onto the intermediate transfer belt 40 and superimposed. The image forming apparatus 1 further includes a sheet feeder 61, a secondary transfer roller 65, and a fixing device 66. The sheet feeder 61 accommodates sheets P such as paper sheets. The secondary transfer roller 65 transfers the toner image formed on the intermediate transfer belt 40 onto the sheet P. The fixing device 66 fixes an unfixed toner image on the sheet P. The image forming apparatus 1 still further includes toner containers 70, cleaning devices 23, an intermediate transfer belt cleaner 81, and a waste-toner container 80. The toner containers 70 supply toners of respective colors to the developing devices 26 of the corresponding process cartridges 20Y, 20M, 20C, and 20BK. The waste-toner container 80 collects a toner collected by the cleaning devices 23 (see FIG. 2) or an untranferred toner collected by the intermediate transfer belt cleaner 81.

Figure 2:
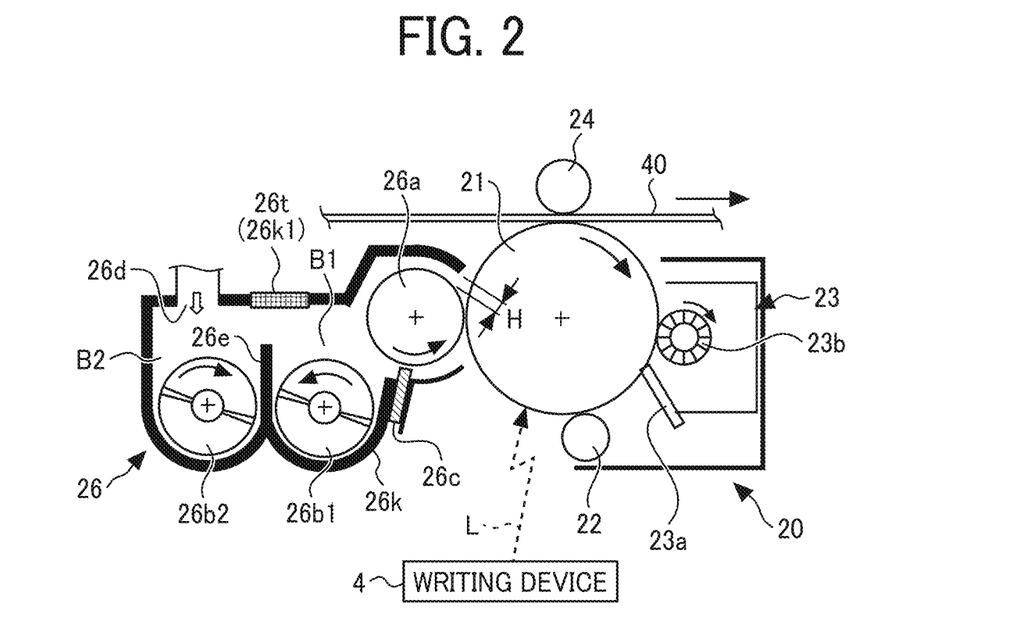
FIG. 2 is a cross-sectional view of an image forming unit of the image forming apparatus of FIG. 1.

Each of the process cartridges 20Y, 20M, 20C, and 20BK includes the photoconductor drum 21 as an image bearer, a charging device 22, and the cleaning device 23, which are united as a single unit as illustrated in FIG. 2. Each of the process cartridges 20Y, 20M, 20C, and 20BK, which is expendable, is removed from a main body of the image forming apparatus 1 and replaced with a new one when depleted in the main body of the image forming apparatus 1. The developing device 26 is disposed to face the photoconductor drum 21 in each of the process cartridges 20Y, 20M, 20C, and 20BK. Each of the developing devices 26, which is expendable, is removed from a main body of the image forming apparatus 1 and replaced with a new one when depleted in a main body of the image forming apparatus 1. An operator may independently perform an installation and a removal operation of the developing device 26 with respect to the main body of the image forming apparatus 1, and an installation and a removal operation of the process cartridges 20Y, 20M, 20C, and 20BK with respect to the main body of the image forming apparatus 1, as different operations. In the process cartridges 20Y, 20M, 20C, and 20BK, the yellow, magenta, cyan, and black toner images are formed on the respective photoconductor drums 21 as the image bearers.

A description is provided below of operations of the image forming apparatus 1 to form a normal color toner image. A conveyance roller of the document conveyor 2 conveys a document from a document table onto an exposure glass of the scanner 3. The scanner 3 optically scans image data for the document on the exposure glass. The yellow, magenta, cyan, and black image data are transmitted to the writing device 4. The writing device 4 irradiates the surface of the photoconductor drums 21 (see FIG. 2) of the corresponding process cartridges 20Y, 20M, 20C, and 20BK with laser beams (as exposure light) L according to the yellow, magenta, cyan, and black image data, respectively.

Each of the four photoconductor drums 21 rotates clockwise in FIGS. 1 and 2. The surface of the photoconductor drum 21 is uniformly charged at a position where the photoconductor drum 21 faces the charging device 22 that is a charging roller (in a charging process). Thus, the surface of the photoconductor drum 21 is charged to a certain potential. When the charged surface of the photoconductor drum 21 reaches a position to receive the laser beam L emitted from the writing device 4, an electrostatic latent image is formed on the surface of the photoconductor drum 21 according to the image data (in an exposure process).

The laser beam L corresponding to a yellow image data is emitted to the surface of photoconductor drum 21 in the process cartridge 20Y, which is the first from the left in FIG. 1 among the four process cartridges 20Y, 20M, 20C, and 20BK. A polygon mirror that rotates at high velocity deflects the laser beam L for the yellow image data so that the laser beam L scans the surface of the photoconductor drum 21 along an axial direction of the photoconductor drum 21 (i.e., the main scanning direction). Thus, an electrostatic latent image corresponding to the yellow image data is formed on the photoconductor drum 21 charged by the charging device 22. Similarly, the laser beam L corresponding to the cyan image data is emitted to the surface of the photoconductor drum 21 in the second process cartridge 20C from the left in FIG. 1, thus forming an electrostatic latent image for cyan on the surface of the photoconductor drum 21. The laser beam L corresponding to the magenta image data is emitted to the surface of the photoconductor drum 21 in the third process cartridge 20M from the left in FIG. 1, thus forming an electrostatic latent image for magenta on the surface of the photoconductor drum 21. The laser beam L corresponding to the black image data is irradiated to the surface of the photoconductor drum 21 in the fourth process cartridge 20BK from the left in FIG. 1, thus forming an electrostatic latent image for black on the photoconductor drum 21.

Then, the surface of the photoconductor drum 21 bearing the electrostatic latent image reaches a position facing the developing device 26. The developing device 26 supplies toner onto the surface of the photoconductor drum 21 and develops the electrostatic latent image on the photoconductor drum 21 into a toner image (in a development process). Subsequently, the surface of the photoconductor drum 21 reaches a position facing the intermediate transfer belt 40. Each of primary transfer rollers 24 is disposed at the position where the photoconductor drum 21 faces the intermediate transfer belt 40 such that the primary transfer roller 24 contacts an inner circumferential surface of the intermediate transfer belt 40. At the positions of the primary transfer rollers 24, the toner images on the photoconductor drums 21 are sequentially transferred to and superimposed on the intermediate transfer belt 40, forming a multicolor toner image thereon (in a primary transfer process).

After the primary transfer process, the surface of the photoconductor drum 21 reaches a position facing the cleaning device 23. The cleaning device 23 collects untransferred toner remaining on the photoconductor drum 21 (in a cleaning process). The untransferred toner collected in the cleaning device 23 passes through a waste-toner conveyance path and is collected as waste toner in the waste-toner container 80. Subsequently, a residual potential of the surface of the photoconductor drum 21 is removed at a position facing a discharger. Thus, a series of image forming processes performed on the photoconductor drum 21 is completed.

Meanwhile, the surface of the intermediate transfer belt 40, onto which the single-color toner images on the photoconductor drums 21 are transferred and superimposed, moves in a direction indicated by arrow in FIG. 1 and reaches a position facing the secondary transfer roller 65. The secondary transfer roller 65 secondarily transfers the multicolor toner image on the intermediate transfer belt 40 onto the sheet P (in a secondary transfer process). After the secondary transfer process, the surface of the intermediate transfer belt 40 reaches a position facing an intermediate transfer belt cleaner 81. The intermediate transfer belt cleaner 81 collects the untransferred toner on the intermediate transfer belt 40 to complete a series of transfer processes on the intermediate transfer belt 40. The untransferred toner collected in the intermediate transfer belt cleaner 81 passes through the waste-toner conveyance path and is collected as waste toner in the waste-toner container 80.

The sheet P is conveyed from the sheet feeder 61 to the position of the secondary transfer roller 65 via a registration roller pair 64. Specifically, a feed roller 62 feeds the sheet P from the top of multiple sheets P accommodated in the sheet feeder 61. The sheet P is conveyed to the registration roller pair 64 through a sheet conveyance passage. Activation of the registration roller pair 64 is timed to convey the sheet P that has reached the registration roller pair 64 toward the position of the secondary transfer roller 65 such that the sheet P meets the multicolor toner image on the intermediate transfer belt 40 at an area of contact, herein called a secondary transfer nip, between the secondary transfer roller 65 and the intermediate transfer belt 40.

Subsequently, the sheet P, onto which the multicolor image is transferred, is conveyed to the fixing device 66. The fixing device 66 includes a fixing roller and a pressure roller pressed against the fixing roller. In an area of contact, herein called a fixing nip, between the fixing roller and the pressure roller, the multicolor toner image is fixed on the sheet P. After the fixing process, an output roller pair 69 ejects the sheet P as an output image outside the main body of the image forming apparatus 1. The ejected sheet P is stacked on an output tray 5 to complete a series of image forming processes.

Next, with reference to FIGS. 2 and 3, image forming units of the image forming apparatus are described in detail below. The four image forming units disposed in the main body of the image forming apparatus 1 have a similar configuration except the color of the toner used in the image forming processes. Therefore, parts of the image forming unit such as the process cartridge and the developing device are illustrated without suffixes Y, M, C, and BK, which denote the colors of the toner, in the drawings.

As illustrated in FIG. 2, the process cartridge 20 mainly includes the photoconductor drum 21 as the image bearer, the charging device 22, and the cleaning device 23, which are stored in a case of the process cartridge 20 as a single unit. The photoconductor drum 21 is an organic photoconductor designed to be charged with a negative polarity and includes a photosensitive layer formed on a drum-shaped conductive support. The charging device 22 is a charging roller including a conductive core and an elastic layer of moderate resistivity overlaid on the conductive core. A power supply applies a given voltage to the charging device 22 (as a charging roller). The charging device 22 uniformly charges the surface of the photoconductor drum 21 facing the charging device 22. The cleaning device 23 includes a cleaning blade 23a and a cleaning roller 23b that contact the photoconductor drum 21. For example, the cleaning blade 23a is made of rubber, such as urethane rubber, and contacts the surface of the photoconductor drum 21 at a predetermined angle with a predetermined pressure. The cleaning roller 23b is a brush roller in which brush bristles are disposed around a core.

Figure 3:
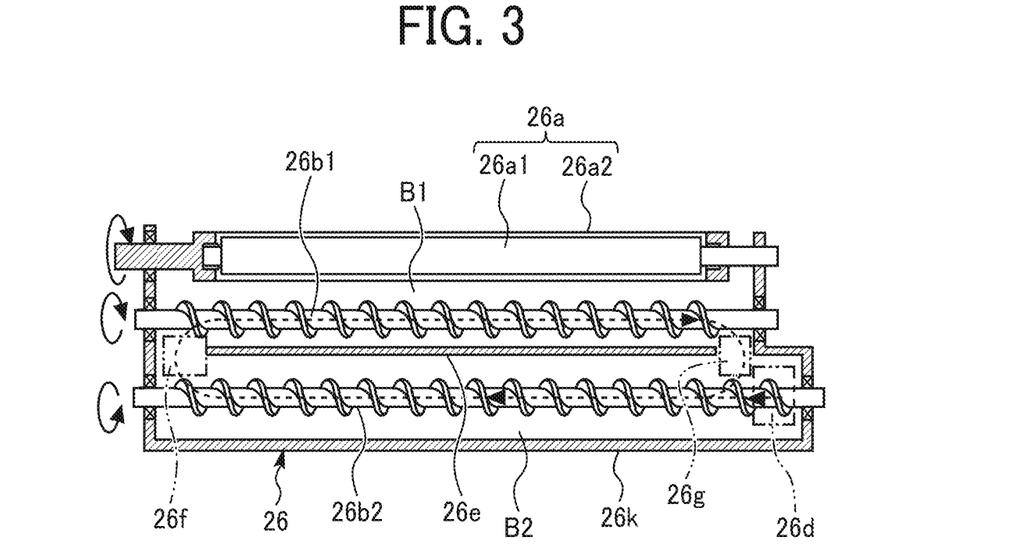
FIG. 3 is a diagram illustrating a developing device in a longitudinal direction of the image forming apparatus of FIG. 1.

As illustrated in FIGS. 2 and 3, the developing device 26 mainly includes a developing roller 26a as a developer bearer, a first conveying screw 26b1 as a first conveyor facing the developing roller 26a, a partition 26e, a second conveying screw 26b2 as a second conveyor facing the first conveying screw 26b1 via the partition 26e, and a doctor blade 26c as a developer regulator facing the developing roller 26a to regulate an amount of developer borne on the developing roller 26a. The developing device 26 in the present embodiment also functions as a filter holding device that holds a filter 26t (as a toner filter). A detailed description of the developing device 26 serving as a filter holding device is deferred.

The developing device 26 stores a two-component developer including carrier and toner. The developing roller 26a faces the photoconductor drum 21 with a small gap, thereby forming a developing range. As illustrated in FIG. 3, the developing roller 26a includes a stationary magnet 26a1 secured inside and a sleeve 26a2 that rotates around the magnets 26a1. The magnet 26a1 generates multiple magnetic poles around an outer circumferential surface of the developing roller 26a.

The first conveying screw 26b1 and the second conveying screw 26b2 as conveyors convey the developer stored in the developing device 26 in a longitudinal direction of the developing device 26, thereby establishing a circulation path indicated by the dashed arrow in FIG. 3. In other words, the first conveying screw 26b1 establishes a first conveyance path B1, whereas the second conveying screw 26b2 establishes a second conveyance path B2. The circulation path of the developer includes the first conveyance path B1 and the second conveyance path B2. The partition 26e is an inner wall and separates the first conveyance path B1 from the second conveyance path B2. The first conveyance path B1 and the second conveyance path B2 communicate with each other via a first communication opening 26f and a second communication opening 26g disposed at both longitudinal ends of the first conveyance path B1 and the second conveyance path B2. Specifically, with reference to FIG. 3, in a conveyance direction of the developer, an upstream end of the first conveyance path B1 communicates with a downstream end of the second conveyance path B2 via the first communication opening 26f. On the other hand, in the conveyance direction of the developer, a downstream end of the first conveyance path B1 communicates with an upstream end of the second conveyance path B2 via the second communication opening 26g. That is, the partition 26e is disposed along the circulation path except the both longitudinal ends of the circulation path. The first conveying screw 26b1 (or the first conveyance path B1) is disposed facing the developing roller 26a. The second conveying screw 26b2 (or the second conveyance path B2) is disposed facing the first conveying screw 26b1 (or the first conveyance path B1) via the partition 26e. The first conveying screw 26b1 supplies developer toward the developing roller 26a and collects the developer separated from the developing roller 26a after the development process while conveying the developer in the longitudinal direction of the developing device 26. The second conveying screw 26b2 stirs and mixes the developer after the development process conveyed from the first conveyance path B1 with a fresh toner supplied from a toner supply inlet 26*d* while conveying the developer and the fresh toner in the longitudinal direction of the developing device 26. In the present embodiment, the two conveying screws (i.e., the first conveying screw 26*b*1 and the second conveying screw 26*b*2) are horizontally arranged in parallel. Each of the two conveying screws (i.e., the first conveying screw 26*b*1 and the second conveying screw 26*b*2) includes a shaft and a screw blade wound around the shaft.

Referring now to FIGS. 2 and 3, a detailed description is given of the image forming process described above, focusing on the development process. The developing roller 26*a* rotates in a direction indicated by arrow in FIG. 2. As illustrated in FIGS. 2 and 3, the first conveying screw 26*b*1 and the second conveying screw 26*b*2 are disposed facing each other with the partition 26*e* interposed therebetween and rotate in directions indicated by arrows in FIGS. 2 and 3. Toner is supplied from the toner container 70 to the toner supply inlet 26*d* via a toner supply path. As the first conveying screw 26*b*1 and the second conveying screw 26*b*2 rotate in the respective directions in FIG. 2A, the developer stored in the developing device 26 circulates together with the supplied toner in the longitudinal direction of the developing device 26 (i.e., the direction indicated by the dashed arrow in FIG. 3) while being stirred and mixed with the supplied toner. Stirring the developer causes the toner to be charged by friction with carrier in the developer and electrostatically attracted to the carrier. A magnetic force is generated on the developing roller 26*a* to scoop up the carrier. The magnetic force that is called as a developer scooping pole scoops up the carrier with the toner on the developing roller 26*a*. The developer borne on the developing roller 26*a* is conveyed in the counterclockwise direction indicated by arrow in FIG. 2 to a position facing the doctor blade 26*c*.

The doctor blade 26*c* adjusts the amount of the developer on the developing roller 26*a* to a proper amount at the position. Subsequently, the rotation of the sleeve 26*a*2 conveys the developer to the developing area in which the developing roller 26*a* faces the photoconductor drum 21. The toner in the developer is attracted to the electrostatic latent image formed on the photoconductor drum 21 due to the effect of an electric field generated in the developing area. Thereafter, as the sleeve 26*a*2 rotates, the developer remaining on the developing roller 26*a* reaches above the first conveyance path B1 and is separated from the developing roller 26*a*. The electric field in the developing area is generated by a predetermined voltage (in other words, a development bias) applied to the developing roller 26*a* by a development power supply and a surface potential (in other words, a latent image potential) formed on the photoconductor drum 21 in the charging process and the exposure process.

The toner in the toner container 70 is supplied as appropriate from the toner supply inlet 26*d* to the developing device 26 via the toner supply path as the toner in the developing device 26 is consumed. The toner consumption in the developing device 26 is detected by a toner concentration sensor that magnetically detects a toner concentration in the developer (i.e., a ratio of toner to the developer) in the developing device 26. The toner supply inlet 26*d* is disposed above an end of the second conveying screw 26*b*2 (or the second conveyance path B2) in a longitudinal direction of the second conveying screw 26*b*2 (i.e., a lateral direction in FIG. 3).

Figure 4A:
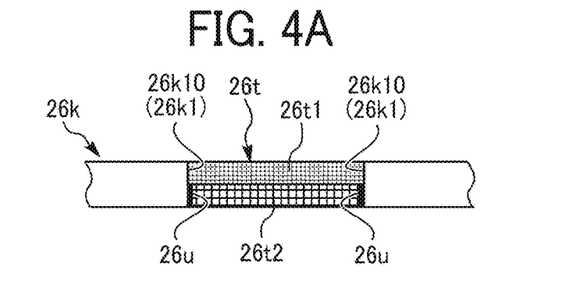
FIG. 4A is an enlarged cross-sectional view of an opening portion of the developing device of FIG. 3 provided with a filter.

The configuration and operation of the developing device 26 as the filter holding device according to the present embodiment are described in detail below. With reference to FIGS. 2 and 4A, the developing device 26 in the present embodiment functions as the filter holding device in which the filter 26*t* is disposed in an opening portion 26*k*1 as a communication port between the inside and outside of the developing device 26. In FIG. 4A, above a developing case 26*k* is the outside of the developing device 26. Below the developing case 26*k* is the inside of the developing device 26. Specifically, the opening portion 26*k*1 (as a ventilation path) through which air passes from the inside to the outside the developing device 26 is formed on the ceiling of the developing case 26*k* (as a housing) of the developing device 26. The filter 26*t* is disposed so as to close the opening portion 26*k*1. The filter 26*t* collects toner as powder and ventilates the developing device 26. In other words, the opening portion 26*k*1 (as a ventilation path) through which air passes through from the inside to the outside of the developing device 26 is formed in the developing case 26*k*. The filter 26*t* is disposed with the opening portion 26*k*1 as a mounting portion. The filter 26*t* is a screen having a mesh size smaller than the particle diameters of toner T and carrier C and thus allows only air to pass through. The filter is not limited to the above described one, but may be a fiber filter that has a good property to collect toner T. In the present embodiment, the opening portion 26*k*1 is open in a substantially rectangular shape. The filter 26*t* (which is in a single state) is formed in a substantially rectangular shape. Shapes of the opening portion 26*k*1 and the filter 26*t* are not limited to the shapes illustrated in the present embodiment.

A casing gap H is formed between the developing roller 26*a* and the developing case 26*k* downstream from the development area in the direction of rotation of the developing roller 26*a*. The casing gap H is set to be within a range of 0.6 mm to 1.0 mm. Note that, if the casing gap H is smaller than 0.6 mm, the developer borne on the developing roller 26*a* after the development process may not smoothly conveyed through the casing gap H between the developing roller 26*a* and the developing case 26*k*, causing the developer to overflow from the casing gap H and to leak to the outside of the developing device 26. On the other hand, if the casing gap H is larger than 1.0 mm, the developer borne on the developing roller 26*a* is not likely to be in sliding contact with the inner surface of the developing case 26*k*, hardly generating a suction airflow toward the inside of the developing device 26 due to a pump action. As a result, toner is likely to scatter to the development area. To prevent such a situation, with the casing gap H kept within an appropriate range, a leakage of the developer and toner scattering is reduced. The internal pressure of the developing device 26 is likely to increase due to the suction airflow through the casing gap H described above. If the internal pressure increases, the toner may scatter from gaps of the developing device 26. To address such a situation, in the present embodiment, since the opening portion 26*k*1 provided with the filter 26*t* is provided to collect the toner T, only air is ventilated while preventing the toner T from scattering to the outside. As a result, the increase of the internal pressure of the developing device 26 is reduced. That is, this configuration inhibits the toner scattering caused by the increase of the internal pressure of the developing device 26.

In the present embodiment, the filter 26*t* has a lower weight density per unit volume at a first side (the lower side in FIG. 4A), than at a second side (the upper side in FIG. 4A). That is, the filter 26*t* has an uneven weight density per unit volume. The filter 26*t* has a portion having a relatively low weight density and a portion having a relatively high weight density in a ventilation direction, which may be referred to as a communication direction. In other words, the filter 26*t* has a gradient of the weight density per unit volume.

More specifically, in the present embodiment, the filter 26*t* has a two-layer structure including a low-density portion 26*t*2 having a relatively low weight density per unit volume formed at the first side (the lower side in FIG. 4A) of the filter 26*t* and a high-density portion 26*t*1 having a relatively high weight density per unit volume formed at the second side of the filter 26*t*. That is, the low-density portion 26*t*2 at the first side of the filter 26*t* has coarse meshes and is relatively fluffy, while the high-density portion 26*t*1 at the second side of the filter 26*t* has meshes in a clogged state. Therefore, in the filter 26*t* in the present embodiment, the toner collecting ability of the high-density portion 26*t*1 is higher than the toner collecting ability of the low-density portion 26*t*2.

In the developing device 26 of the present embodiment, the opening portion 26*k*1 has a rim 26*k*10 (as a wall portion) extending in the communication direction) in which the air flows from the inside of the developing device 26 to the outside of the developing device 26. The communication direction (i.e., the ventilation direction) is a vertical direction in FIGS. 2 and 4A). The filter 26*t* is disposed in the opening portion 26*k*1 such that the first side (i.e., the low-density portion 26*t*2 having a relatively low weight density) is located adjacent to the inside of the developing device 26 (i.e., at the lower end side in FIG. 4A), whereas the second side (i.e., the high-density portion 26*t*1 having a relatively high weight density) is located adjacent to the outside of the developing device 26 (i.e., at the upper end side in FIG. 4A). Further, the filter 26*t* is disposed in the opening portion 26*k*1 such that each side face serving as a non-ventilated face (i.e., a face through which air does not flow) of the filter 26*t* is in contact with the rim 26*k*10. FIG. 4A two-dimensionally illustrates the filter 26*t* disposed in (or fitted to) the opening portion 26*k*1 such that the filter 26*t* is in contact with the rim 26*k*10. However, in reality, the filter 26*t* is disposed in the opening portion 26*k*1 such that the four side faces of the filter 26*t* are in contact with the substantially rectangular rim 26*k*10.

Figure 4B:
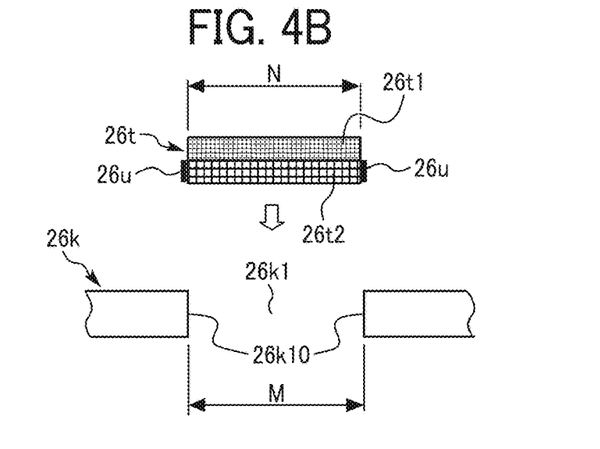
FIG. 4B is an enlarged cross-sectional view of the opening portion of the developing device of FIG. 3 before being provided with the filter.

That is, in the present embodiment, when the filter 26*t* is not disposed in the opening portion 26*k*1 and does not receive an external force as illustrated in FIG. 4B, the filter 26*t* includes the high-density portion 26*t*1 at the second side, which is an upper end side of the filter 26*t* in FIG. 4B, and the low-density portion 26*t*2 having a lower weight density per unit volume at the first side, which is a lower side of the filter 26*t* in FIG. 4B, than the weight density per unit volume of the high-density portion 26*t*1. Specifically, when the filter 26*t* is not disposed in the opening portion 26*k*1, a length N of the filter 26*t* in a direction intersecting the ventilation direction is set to be larger than an opening width M, which is a length of the opening portion 26*k*1 in the direction intersecting the ventilation direction (N>M). As illustrated in FIG. 4A, the filter 26*t* is disposed in close contact with the opening portion 26*k*1 while being compressed conforming to the shape of the opening portion 26*k*1. Note that, even when the filter 26*t* is disposed in the opening portion 26*k*1, the magnitude relationship in weight density between the high-density portion 26*t*1 and the low-density portion 26*t*2 is maintained.

Referring to FIG. 4A, in the present embodiment, at least the first side of the filter 26*t* (i.e., the low-density portion 26*t*2 on the lower side of the filter 26*t* in FIG. 4A) is covered with an air-impermeable member 26*u*. In other words, at least the first side (i.e., the low-density portion 26*t*2) of the filter 26*t* is in contact with the rim 26*k*10 of the opening portion 26*k*1 via the air-impermeable member 26*u*. Specifically, in the filter 26*t* in the present embodiment with reference to FIG. 4B, the portion of the low-density portion 26*t*2 in contact with the rim 26*k*10 (in other words, the four side faces serving as the non-ventilated faces of the low-density portion 26*t*2) is covered with the air-impermeable member 26*u* over the entire circumference. In the present embodiment, the air-impermeable member 26*u* is a film (as a sheet-shaped member) made of a resin material such as polyethylene terephthalate and having a thickness of about 0.1 mm to 2 mm. Specifically, a rectangular film as the air-impermeable member 26*u* with a double-sided tape is wound around the side faces of the low-density portion 26*t*2 for one or more turns. Further, at least the low-density portion 26*t*2 of the filter 26*t* is covered with the air-impermeable member in the direction intersecting the ventilation direction in which air is exhausted from the inside to the outside of the developing device 26.

In the developing device 26 of the present embodiment, since at least the side face (i.e., the air-impermeable face) of the low-density portion 26*t*2 is covered with the air-impermeable member 26*u*, air (to be discharged) leaks together with toner (to be collected) from the sides of the filter 26*t* between the filter 26*t* and the opening portion 26*k*1 are reduced. Since the function of the filter 26*t* described above is fully performed, the toner (to be collected) scattering to the outside of the developing device 26 is reduced. Specifically, the filter 26*t* has a portion having a relatively low weight density per unit volume and a relatively weak adhesion to the rim 26*k*10. The air easily leaks from the portion together with the toner. To address such a situation, in the present embodiment, since the portion is covered with the air-impermeable member 26*u* to improve the adhesion of the portion to the rim 26*k*10 (and therefore to the opening portion 26*k*1. In the present embodiment, the filter 26*t* having a weight density increasing in the ventilation direction (i.e., the communication direction) facilitates the air flow from the inside to the outside of the developing device 26. With such a configuration, the increase of the internal pressure in the developing device 26 is efficiently restrained. The overall toner collection property of the filter 26*t* is enhanced while the filter 26*t* is less likely to be clogged.

In the present embodiment, the filter 26*t* is attachable from and removable to the outside of the developing device 26. Specifically, when the filter 26*t* is attached, as illustrated in FIG. 4B, the filter 26*t* is moved from above the developing device 26 (specifically, the opening portion 26*k*1) in a direction indicated by the white arrow in FIG. 4B. As illustrated in FIG. 4A, the filter 26*t* is fitted into the opening portion 26*k*1.

Although a film is used as the air-impermeable member 26*u* in the present embodiment, a fluid member may be applied to the side face of the filter 26*t* and then cured, thus being used as the air-impermeable member 26*u*. As a specific example, the air-impermeable member 26*u* may be formed of an ultraviolet (UV) curable resin. Specifically, a fluid UV curable resin is applied to the side face of the low-density portion 26*t*2 of the filter 26*t*. Then, the applied UV curable resin is irradiated with ultraviolet rays to be cured. In a case in which the air-impermeable member 26*u* is thus made of a UV curable resin, the cost of the air-impermeable member 26*u* is higher than the cost of the air-impermeable member 26*u* made of a film. However, the air-impermeable member 26u made of a UV curable resin is less likely to be peeled off from the filter 26t.

In the present embodiment, only the side face of the low-density portion 26t2 of the filter 26t is covered with the air-impermeable member 26u. That is, the filter 26t is covered with the air-impermeable member 26u over an entire circumferential surface of the low-density portion 26t2. Alternatively, the entire portion of the filter 26t in contact with the rim 26k10 may be covered with the air-impermeable member 26u over the entire circumference. That is, the filter 26t may be covered with the air-impermeable member 26u over the entire circumference. In this case, in the filter 26t, the side face (air-impermeable face) of the low-density portion 26t2 and the side face (air-impermeable face) of the high-density portion 26t1 are covered with the air-impermeable member 26u. Such a case also provides substantially the same effects as the effects described above. However, in a case in which only the side face of the low-density portion 26t2 of the filter 26t is covered with the air-impermeable member 26u, the positions of the high-density portion 26t1 and the low-density portion 26t2 are easily distinguished. Accordingly, the filter 26t is less likely to be disposed in the opening portion 26k1 upside.

Figure 5A:
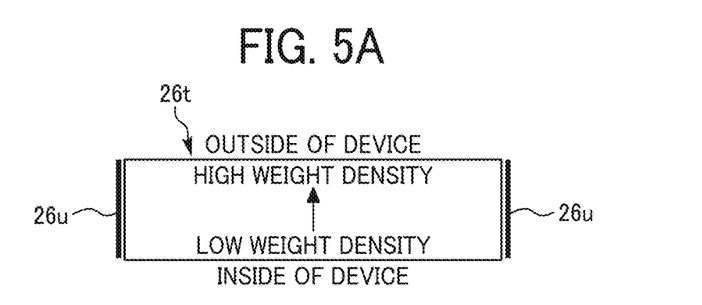
FIG. 5A is a side cross-sectional view of a filter according to another embodiment.
Figure 5B:
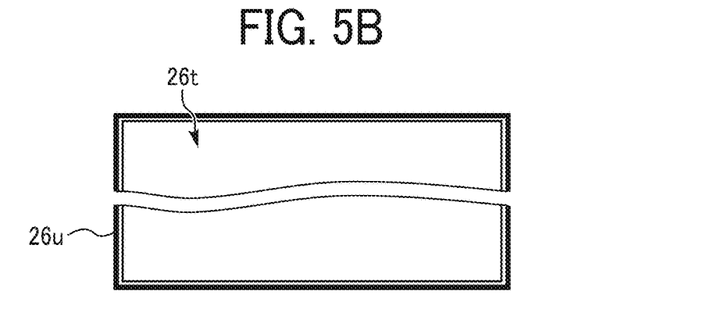
FIG. 5B is a bottom view of the filter of FIG. 5A.

In the present embodiment, as the filter 26t, a filter having a two-layer structure including the high-density portion 26t1 and the low-density portion 26t2 is used. On the other hand, as illustrated in FIG. 5A, the filter 26t may have a weight density per unit volume gradually increasing in a direction indicated by the arrow in FIG. 5A from the first side adjacent to the inside of the developing device 26 to the second side adjacent to the outside of the developing device 26. In short, the filter 26t has a weight density per unit volume gradually increasing along the ventilation direction, which may be referred to as an exhaust direction. Specifically, the filter 26t illustrated in FIG. 5A is coarse and relatively fluffy at the first side, from which the filter 26t is gradually clogged toward the second side. The filter 26t may be manufactured, for example, by laminating a plurality of layers having different weight densities per unit volume. As illustrated in FIGS. 5A and 5B, the entire portion of the filter 26t in contact with the rim 26k10 is covered with the air-impermeable member 26u over entire circumference.

First Variation

Figure 6A:
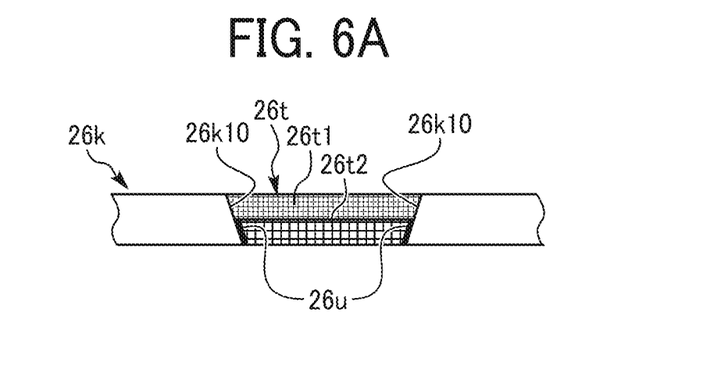
FIG. 6A is an enlarged cross-sectional view of an opening portion of a developing device provided with a filter according to a first variation.
Figure 6B:
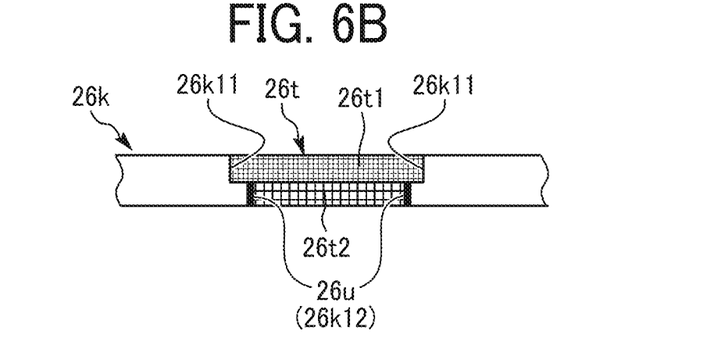
FIG. 6B is an enlarged cross-sectional view of another opening portion of the developing device provided with the filter according to the first variation.

As illustrated in FIGS. 6A and 6B, in the developing device 26 in the first variation, rims (26k10, 26k11, and 26k12) of the opening portion 26k1 are formed such that the opening area of the opening portion 26k1 decreases from the outside of the developing device 26 toward the inside of the developing device 26. Even in the first variation, at least the low-density portion 26t2 is in contact with the rim 26k10 via the air-impermeable member 26u. Specifically, in the developing device 26 illustrated in FIG. 6A, the rim 26k10 of the opening portion 26k1 is formed such that the opening area of the opening portion 26k1 continuously decreases from the outside of the developing device 26 toward the inside of the developing device 26 (downward in FIG. 6A). That is, the rim 26k10 has an inclined face that is inclined so as to be apart from the central portion of the opening portion 26k1 in the discharge direction (i.e., ventilation direction) in which the air is discharged to the outside of the developing device 26. The inclined rim 26k10 allows compression of the low-density portion 26t2 that is easily compressible at an increased rate. Thus, the adhesion of the filter 26t to the opening portion 26k1 is enhanced. The filter 26t is easily attached from the outside of the developing device 26 to the opening portion 26k1, whereas the filter 26t is easily removed from the developing device 26. Further, the lower end of the inclination of the rim 26k10 functions as a restricting portion that prevents the filter 26t from dropping into the developing device 26. Such a configuration also prevents the air in the developing device 26 from being discharged to the outside of the developing device 26 together with the toner without passing through the filter 26t.

On the other hand, in the developing device 26 illustrated in FIG. 6B, the rim 26k10 of the opening portion 26k1 is formed such that the opening area of the opening portion 26k1 decreases in a stepped manner from the outside of the developing device 26 toward the inside of the developing device 26 (downward in FIG. 6B). Specifically, the opening portion 26k1 having a two-stage structure includes a first rim 26k11 (illustrated as an upper portion in FIG. 6B) having a relatively large opening area adjacent to the outside of the developing device 26 and a second rim 26k12 (illustrated as a lower portion in FIG. 6B) having a relatively small opening area adjacent to the inside of the developing device 26. The filter 26t is disposed such that the high-density portion 26t1 is fitted to the first rim 26k11 and the low-density portion 26t2 is in contact with the second rim 26k12 via the air-impermeable member 26u. Such a configuration also prevents the air in the developing device 26 from being discharged to the outside of the developing device 26 together with the toner without passing through the filter 26t. Like the case as illustrated in FIG. 6A, the rims 26k11 and 26k12 formed such that the opening area is decreased in a stepped manner enhances an attaching and detaching operability of the filter 26t to and from the opening portion 26k1. The step between the rims 26k11 and 26k12 prevents the filter 26t from dropping in the developing device 26.

Second Variation

Figure 7:
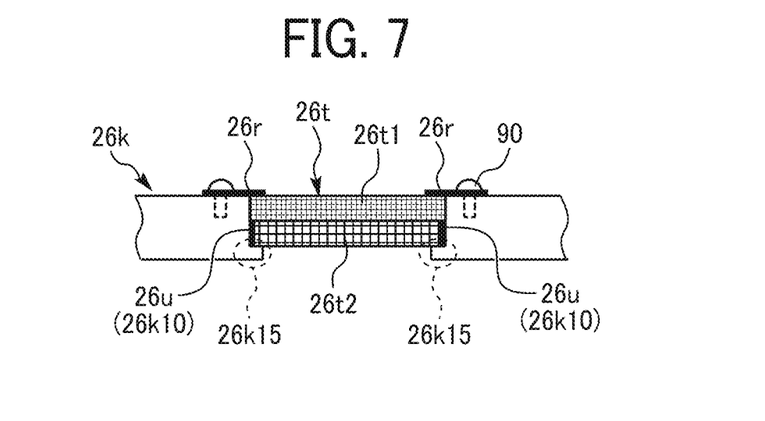
FIG. 7 is an enlarged cross-sectional view of an opening portion of a developing device provided with a filter according to a second variation.

As illustrated in FIG. 7, the developing device 26 in the second variation includes a restricting portion 26k15 that restricts the filter 26t from dropping into the developing device 26 from the opening portion 26k1 (specifically, the rim 26k10). Specifically, the restricting portion 26k15 that protrudes in a direction of narrowing the opening portion 26k1 is formed below the opening portion 26k1 (rim 26k10) of the developing case 26k. The restricting portion 26k15 contacts the first side of the filter 26t (i.e., the low-density portion 26t2 having a relatively low weight density). The restricting portion 26k15 prevents the filter 26t disposed in the opening portion 26k1 from dropping into the developing device 26. The restricting portion 26k15 also facilitates determination of a vertical position of the filter 26t in the opening portion 26k1.

In the developing device 26 of the second variation, stoppers 26r that contact the outside of the filter 26t (specifically, the high-density portion 26t1 having a relatively high weight density of the filter 26t) are detachably disposed so that the filter 26t does not come out from the opening portion 26k1 (specifically, the rim 26k10) to the outside of the developing device 26. Specifically, in order to prevent the filter 26t from coming off upward, the stoppers 26r are fixed (or screw-fastened) to the developing case 26k by screws 90 so as to press the filter 26t from above. In the second variation, a plate-shaped member having an opening inside is used as the stopper 26r. The stopper 26r is not limited to such a plate-shaped member having an opening inside as long as the stopper 26r does not impair the function of the filter 26t. As the stopper 26r, for example, a reticulate member having coarse meshes may be used. In the second variation, since the low-density portion 26t2 of the filter 26t is in contact with the rim 26k10 via the air-impermeable member 26u, an unfavorable situation in which the air in the developing device 26 is discharged to the outside with the toner without passing through the filter 26t is addressed.

As described above, the developing device 26 in the present embodiment is a filter holding device in which the filter 26t is disposed in the opening portion 26k1 as a communication port between the inside and outside of the developing device 26. The filter 26t is formed such that the weight density per unit volume at the first side of the filter 26t is smaller than the weight density per unit volume at the second side of the filter 26t. The filter 26t is disposed in the opening portion 26k1 such that the first end side is located adjacent to the inside of the developing device 26 and the second end side is located adjacent to the outside of the developing device 26. Further, at least the first side (i.e., the first side having a relatively low weight density) of the filter 26t is covered with the air-impermeable member 26u. such a configuration prevents the air (to be discharged) in the developing device 26 from being discharged together with the toner to the outside of the developing device 26 (to be collected).

In the present embodiment, the process cartridge 20 does not include the developing device 26. The developing device 26 is a unit that is independently attachable to and removable from the main body of the image forming apparatus 1. Alternatively, the developing device 26 may be one of the constituent elements of the process cartridge 20. In this case, the process cartridge 20 including the developing device 26 as an integral part is attachable to and removable from the main body of the image forming apparatus 1. In such a configuration, similar effects to those of the above-described embodiments and variations are also attained. It is to be noted that the term "process cartridge" used in the present disclosure is defined as a unit that unites an image bearer and at least one of a charging device to charge the image bearer, a developing device to develop a latent image on the image bearer, and a cleaning device to clean the image bearer and that is attachable to and removable from the body of the image forming apparatus.

In the present embodiment, the developing device 26 includes the two conveying screws (i.e., the first conveying screw 26b1 and the second conveying screw 26b2) as the conveyors horizontally arranged in parallel and the doctor blade 26c disposed below the developing roller 26a. The configuration of the developing device is not limited to the above-described configuration. In the developing device according to one or more embodiments of the present disclosure, three or more conveyors may be horizontally arranged in parallel, multiple conveyors may be arranged in parallel in the vertical direction, or the doctor blade may be disposed above the developing roller. In the present embodiment, the developing device 26 accommodates the two-component developer including toner and carrier. Alternatively, according to one or more embodiments of the present disclosure, the developing device may accommodate one-component developer (i.e., toner, which may include additives). Such cases also provide substantially the same effects as the effects described above.

In the present embodiment, the developing device 26 serves as the filter holding device. However, the filter holding device is not limited to the developing device 26. The filter holding device may be any device containing powder such as toner inside, for example, the toner containers 70, the waste-toner container 80, the cleaning devices 23, the intermediate transfer belt cleaner 81, the toner replenishment devices, and the toner conveyors. Further, in the present embodiment, the developing device 26 as a filter holding device collects the toner as a collection subject and discharges the air as a discharge object to the outside of the developing device 26. The combination of the discharge subject and the collection object of the filter holding device is not limited to the combination described above. For example, to the filter holding device may be the main body of the image forming apparatus 1 that collects ozone as a collection object and discharges air, which does not contain ozone, as a discharge object to the outside of the image forming apparatus 1. Such cases also provide substantially the same effects as the effects described above.

Figure 8A:
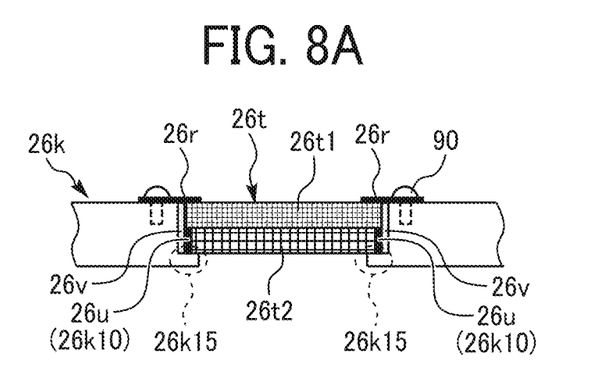
FIG. 8A is an enlarged cross-sectional view of another opening portion of the developing device provided with the filter according to the second variation.
Figure 8B:
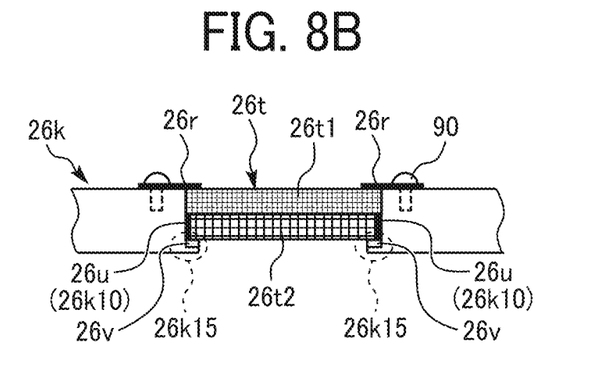
FIG. 8B is an enlarged cross-sectional view of still another opening portion of the developing device provided with the filter according to the second variation.

As illustrated in FIGS. 8A and 8B, the developing device 26 has an elastic member 26v, for example a sponge rubber, to contact the air-impermeable member 26u. When the air-impermeable member 26u deforms for some reasons, such as an impact caused by transportation of the developing device 26, the elastic member 26v seals the deformed space, so that the toner leak is prevented. The elastic member 26v may be disposed either between the rim 26k10 and the air-impermeable member 26u (see FIG. 8A), or between the restricting portion 26k15 and the air-impermeable member 26u (see FIG. 8B).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A filter holding device comprising:
   an opening portion to communicate an inside of the filter holding device with an outside of the filter holding device; and
   a filter disposed in the opening portion, the filter including:
      a first side facing the inside of the filter holding device; and
      a second side facing the outside of the filter holding device,
   wherein the filter has a lower weight density per unit volume at the first side than at the second side,
   wherein at least a side face of the first side of the filter is covered with an air-impermeable member,
   wherein the side face is a lateral face of the filter at the first side, and
   wherein the air-impermeable member is a film.

2. The filter holding device according to claim 1,
   wherein the filter has a two-layer structure in which a low-density portion is disposed on the first side and a high-density portion is disposed on the second side, the low-density portion having a lower weight density per unit volume than the high-density portion, and
   wherein at least the side face of the low-density portion of the filter is covered with the air-impermeable member.

3. The filter holding device according to claim 2,
   wherein the side face of the low-density portion of the filter is covered with the air-impermeable member over an entire circumference of the side face.

4. The filter holding device according to claim 1,
   wherein the side face of the first side of the filter is covered with the air-impermeable member over an entire circumference of the filter.

5. The filter holding device according to claim 1, wherein the air-impermeable member is a member having been cured after application to the filter in a fluid state.

6. The filter holding device according to claim 1, further comprising:
a rim facing the side face,
wherein the rim of the opening portion extends in a communication direction from the inside of the filter holding device toward the outside of the filter holding device.

7. A developing device to accommodate toner inside and to develop a latent image formed on a surface of an image bearer, the developing device comprising the filter holding device according to claim 1.

8. A process cartridge to be detachably attached to a main body of an image forming apparatus, the process cartridge comprising:
the developing device according to claim 7; and
the image bearer.

9. An image forming apparatus comprising the process cartridge according to claim 8.

10. An image forming apparatus comprising the developing device according to claim 7.

11. An image forming apparatus comprising the filter holding device according to claim 1.

12. A filter holding device, comprising:
an opening portion to communicate an inside of the filter holding device with an outside of the filter holding device; and
a filter disposed in the opening portion, the filter including:
a first side facing the inside of the filter holding device; and
a second side facing the outside of the filter holding device,
wherein the filter has a lower weight density per unit volume at the first side than at the second side,
wherein at least a side face of the first side of the filter is covered with an air-impermeable member,
wherein the side face is a lateral face of the filter at the first side,
wherein the air-impermeable member is a member having been cured after application to the filter in a fluid state, and
wherein the air-impermeable member includes an ultraviolet curable resin.

13. A developing device, comprising:
an opening portion to communicate an inside of a filter holding device with an outside of the filter holding device; and
a filter disposed in the opening portion, the filter including:
a first side facing the inside of the filter holding device; and
a second side facing the outside of the filter holding device,
wherein the filter has a lower weight density per unit volume at the first side than at the second side,
wherein at least a side face of the first side of the filter is covered with an air-impermeable member, and
wherein the side face is a lateral face of the filter at the first side,
the developing device further comprising:
a rim facing the side face; and
an elastic member disposed between the air-impermeable member and the rim.

14. A developing device, comprising:
an opening portion to communicate an inside of a filter holding device with an outside of the filter holding device; and
a filter disposed in the opening portion, the filter including:
a first side facing the inside of the filter holding device; and
a second side facing the outside of the filter holding device,
wherein the filter has a lower weight density per unit volume at the first side than at the second side,
wherein at least a side face of the first side of the filter is covered with an air-impermeable member, and
wherein the side face is a lateral face of the filter at the first side,
the developing device further comprising:
a restricting portion at a first side of the opening portion to restrict the filter from dropping into the developing device; and
an elastic member disposed between the air-impermeable member and the restricting portion.

15. A filter comprising:
a high-density portion; and
a low-density portion having a lower weight density per unit volume than the high-density portion,
wherein a side face of the low-density portion is covered with an air-impermeable member as an air-impermeable face, and
wherein the air-impermeable member is a film.

16. The filter according to claim 15, wherein the air-impermeable member is a member having been cured after application to the filter in a fluid state.

17. A filter comprising:
a high-density portion; and
a low-density portion having a lower weight density per unit volume than the high-density portion,
wherein a side face of the low-density portion is covered with an air-impermeable member as an air-impermeable face, and
wherein the air-impermeable member is made of an ultraviolet curable resin.

* * * * *